US009995597B2

United States Patent
Shimizu et al.

(10) Patent No.: US 9,995,597 B2
(45) Date of Patent: Jun. 12, 2018

(54) MAGNETIC POSITION SENSOR AND POSITION DETECTING METHOD

(71) Applicant: Murata Machinery, Ltd., Kyoto-shi, Kyoto (JP)

(72) Inventors: Tetsuya Shimizu, Kyoto (JP); Satoshi Hanaka, Kyoto (JP); Tatsuo Ota, Kyoto (JP); Shogo Terada, Kyoto (JP)

(73) Assignee: Murata Machinery, Ltd. (JP)

( * ) Notice: Subject to any disclaimer, the term of this patent is extended or adjusted under 35 U.S.C. 154(b) by 100 days.

(21) Appl. No.: 14/776,665

(22) PCT Filed: Jan. 31, 2014

(86) PCT No.: PCT/JP2014/052294
§ 371 (c)(1),
(2) Date: Sep. 14, 2015

(87) PCT Pub. No.: WO2014/141767
PCT Pub. Date: Sep. 18, 2014

(65) Prior Publication Data
US 2016/0041005 A1    Feb. 11, 2016

(30) Foreign Application Priority Data
Mar. 15, 2013   (JP) .................. 2013-053993

(51) Int. Cl.
*G01R 33/025*   (2006.01)
*G01B 7/14*   (2006.01)
(Continued)

(52) U.S. Cl.
CPC ............ *G01D 5/142* (2013.01); *G01B 7/023* (2013.01); *G01D 5/145* (2013.01)

(58) Field of Classification Search
CPC ................... G01D 5/145; G01B 7/023
(Continued)

(56) References Cited

U.S. PATENT DOCUMENTS 6,239,789 B1   5/2001   Sekizawa et al. ............ 345/174
6,320,374 B1 * 11/2001   Schroeder ................ G01B 7/30
                                                      324/165
(Continued)

FOREIGN PATENT DOCUMENTS

JP   07-281813 A   10/1995
JP   11-143623 A    5/1999
(Continued)

OTHER PUBLICATIONS

Japanese language International Search Report dated May 13, 2014 and its English language translation issued in corresponding PCT application PCT/JP2014/052294.
(Continued)

*Primary Examiner* — Reena Aurora
(74) *Attorney, Agent, or Firm* — DLA Piper LLP (US)

(57) ABSTRACT

The present invention enables to obtain an approximate position of a zero crossing point in a shorter time period. A magnetic position sensor detects, with an array in which multiple magnetic detection elements are arranged in a straight line, the zero crossing point at which the magnetic flux density from a pair of magnetic poles is zero in a plane perpendicular to the longitudinal direction of the array. The magnetic detection elements are elements whose output changes in polarity when the direction of the magnetic flux density is inverted, and detect an approximate position of the zero crossing point by reading an output of every k-th magnetic detection element of the array (where k is an integer of 2 or greater). Then, the position of the zero crossing point is detected according to outputs of at least two magnetic detection elements on both sides of the zero crossing point.

8 Claims, 9 Drawing Sheets

(51) Int. Cl.
*G01D 5/14* (2006.01)
*G01B 7/02* (2006.01)
(58) Field of Classification Search
USPC .................................. 324/207.12, 207.15
See application file for complete search history.

(56) References Cited

U.S. PATENT DOCUMENTS

| | | | |
|---|---|---|---|
| 8,415,946 B2* | 4/2013 | Bartos | G01D 5/12 |
| | | | 324/207.21 |
| 2002/0005715 A1 | 1/2002 | Sato | 324/207 |
| 2005/0218307 A1 | 10/2005 | Watari | 250/221 |
| 2007/0145970 A1 | 6/2007 | Takahashi | 324/207 |

FOREIGN PATENT DOCUMENTS

| | | | |
|---|---|---|---|
| JP | 2000-231443 A | 8/2000 | |
| JP | 2002-022403 A | 1/2002 | |
| JP | 2007-178158 A | 7/2007 | |
| JP | 2008-209393 A | 9/2008 | |
| JP | 4286698 B2 | 4/2009 | |
| JP | 2012-198048 A | 10/2012 | |

OTHER PUBLICATIONS

Translation of Japanese language International Preliminary Report on Patentability dated Oct. 15, 2015 issued in corresponding PCT application PCT/JP2014/052294.

* cited by examiner

FIG. 4

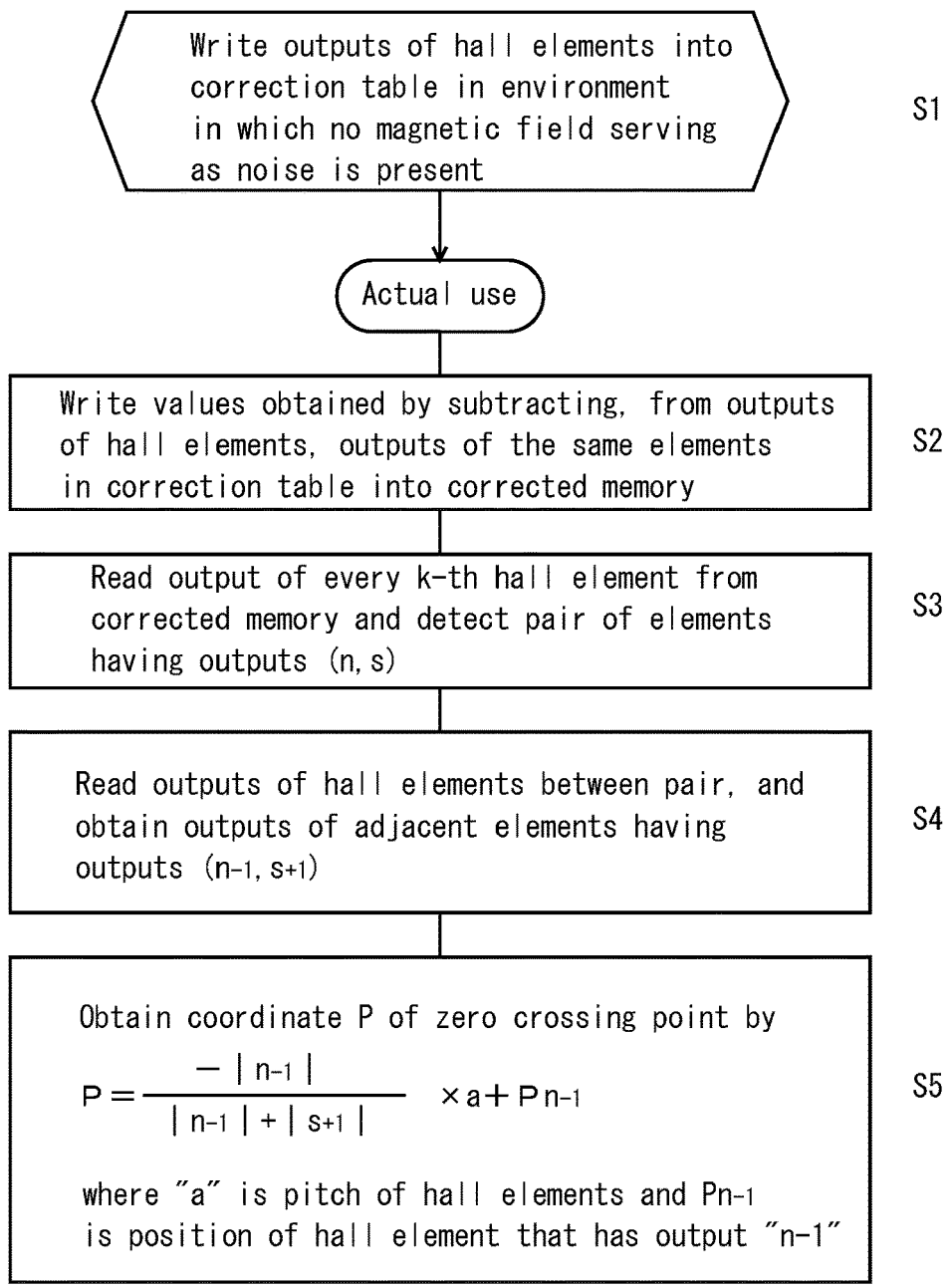

S1: Write outputs of hall elements into correction table in environment in which no magnetic field serving as noise is present Actual use S2: Write values obtained by subtracting, from outputs of hall elements, outputs of the same elements in correction table into corrected memory S3: Read output of every k-th hall element from corrected memory and detect pair of elements having outputs (n, s)

S4: Read outputs of hall elements between pair, and obtain outputs of adjacent elements having outputs (n-1, s+1)

S5: Obtain coordinate P of zero crossing point by $$P = \frac{-|n-1|}{|n-1| + |s+1|} \times a + P_{n-1}$$

where "a" is pitch of hall elements and $P_{n-1}$ is position of hall element that has output "n-1"

MAGNETIC POSITION SENSOR AND POSITION DETECTING METHOD

CROSS REFERENCE TO RELATED APPLICATIONS

This application is a national stage of international application no. PCT/JP2014/052294, filed on Jan. 31, 2014, and claims the benefit of priority under 35 USC 119 of Japanese application no. 2013-053993, filed on Mar. 15, 2013, which are incorporated herein by reference.

BACKGROUND OF THE INVENTION

1. Field of the Invention

The present invention relates to a magnetic position sensor, and in particular to a magnetic position sensor that is capable of detecting positions in a short cycle with accuracy. The present invention further relates to a position detecting method by the magnetic position sensor.

2. Description of the Related Art

The applicant has developed a magnetic position sensor that detects a magnetic mark such as a magnet with a coil array (for example, Patent Literature 1: JP 2008-209393A). This position sensor has a presumption that when the coil array is arranged in parallel to a magnetic pole surface, the magnetic flux density changes in a sine wave shape in the longitudinal direction of the coil array. However, actually, there is a variation in the distance between the coil array and the magnetic pole surface. When the distance deviates from a normal distance, the strength of the magnetic flux density also deviates from the sine wave so as to be approximated to a triangle wave or a trapezoid wave, which causes a detection error.

The above-described position sensor has another problem that it is difficult to detect a position at a high speed, that is, in a short repetition cycle. In the above-described position sensor, an alternating current is applied to the coil array, and the position at which the phase of the voltage, the current, or the like that is applied to the coil is zero is detected. Because it is difficult to increase the frequency of a coil current, the frequency of the alternating current restricts the number of times of detection per unit time.

A position sensor of Patent Literature 2 (JP 2007-178158A) is known as a position sensor in which instead of coils, magnetic detection elements such as hall elements are used. This position sensor detects the density of a magnetic flux from a pair of magnets with an array of magnetic detection elements, and detects a point at which the magnetic flux density is zero, that is, an intermediate point of the pair of magnets. Assuming that this point is referred to as a "zero crossing point", the magnetic detection elements to both sides of the zero crossing point have outputs whose signs are inverted with respect to each other, and the magnetic flux density changes substantially linearly. Accordingly, a straight line that approximates a distribution of outputs of magnetic detection elements in the vicinity of the zero crossing point is obtained by a least squares method, and a point at which the value of the straight line is zero is set as the zero crossing point. In order to obtain the zero crossing point with accuracy and realize a certain level of measurement range, it is necessary to arrange a large number of magnetic detection elements into an array. However, it takes a processing time for scanning outputs of the large number of magnetic detection elements to obtain the position of the zero crossing point.

CITATION LIST

Patent Literatures

Patent Literature 1: JP 2008-209393A
Patent Literature 2: JP 2007-178158A

SUMMARY OF THE INVENTION

It is an object of the present invention to make it possible to obtain the position of the zero crossing point in a shorter time period and to increase the number of times of detection of positions per unit time.

The present invention is directed to a magnetic position sensor having an array in which a plurality of magnetic detection elements are arranged in a straight line, configured to detect a zero crossing point at which a magnetic flux density from a pair of magnetic poles is zero in a plane perpendicular to the longitudinal direction of the array, the magnetic detection elements being elements whose output changes in polarity when the direction of the magnetic flux density is inverted, the magnetic position sensor including:

the array;

an approximate detection unit for the zero crossing point configured to read an output of every k-th magnetic detection element of the array (where k is an integer of 2 or greater), and detect an approximate position of the zero crossing point according to the read output; and a position detection unit configured to detect an accurate position of the zero crossing point according to outputs of at least two magnetic detection elements to both sides of the zero crossing point.

A position detecting method according to the present invention is directed to a position detecting method for detecting, with an array in which a plurality of magnetic detection elements are arranged in a straight line, a zero crossing point at which a magnetic flux density from a pair of magnetic poles is zero in a plane perpendicular to the longitudinal direction of the array, the magnetic detection elements being elements whose output changes in polarity when the direction of the magnetic flux density is inverted, the method comprising the steps of:

reading an output of every k-th magnetic detection element of the array (where k is an integer of 2 or greater), and detecting an approximate position of the zero crossing point according to the read output with an approximate detection unit for the zero crossing point of a position sensor; and detecting an accurate position of the zero crossing point according to outputs of at least two magnetic detection elements to both sides of the zero crossing point with a position detection unit of the position sensor.

According to the present invention, it is sufficient to scan an output of every k-th magnetic detection element, rather than outputs of all the magnetic detection elements. Accordingly, it is possible to reduce the number of the elements to be scanned, and to obtain an approximate position of the zero crossing point at a higher speed. Note that it is not necessary to perform scanning of every k-th magnetic detection element and an approximate position of the zero crossing point can be estimated based on the last data, the estimated position only needs to be used. In this specification, a description regarding the magnetic position sensor will directly be applied also to a description regarding the position detecting method.

It is preferable that the magnetic position sensor further include: a nonvolatile memory in which correction data is stored, the correction data being data acquired in an environment in which there are no magnetic poles that serve as detection targets and used in correcting an output of each magnetic detection element of the array; and a correction unit configured to correct the output of the magnetic detection element according to the correction data stored in the nonvolatile memory.

Some magnetic detection elements have outputs not 0 even when no external magnetic field is applied. Accordingly, by obtaining an offset error of such an output and storing correction data in the nonvolatile memory, it is possible to reduce an influence of the offset error. For example, FIG. 8 shows the detection errors before offset error correction, and FIG. 7 shows the detection errors after the offset error correction.

Furthermore, it is preferable that the approximate detection unit for the zero crossing point be configured to detect an approximate position of the zero crossing point, by reading an output of every k-th magnetic detection element in one direction along the straight line and reading an output of the magnetic detection element that detects the downstream magnetic pole of the pair of magnetic poles.

If it is known to the position sensor which of the pair of magnetic poles is arranged upstream or downstream, the polarity of an output of every k-th magnetic detection element is read, for example, from the upstream side to the downstream side to detect the downstream magnetic pole. Accordingly, the zero crossing point is present between this position and the magnetic detection element arranged upstream thereof by k magnetic detection elements, and it is possible to obtain an approximate position of the zero crossing point at a high speed. As described above, to obtain an approximate position of the zero crossing point is to specify the position of the zero crossing point in a range of k elements or less.

It is preferable that the magnetic detection elements of the array are arranged so that k×a is equal to or smaller than the length of one magnetic pole, where "a" is a pitch of the magnetic detection element, and the approximate detection unit for the zero crossing point is configured to end the reading of an output of every k-th magnetic detection element upon first detecting a magnetic detection element that has an output with a polarity different from that of an initial magnetic detection element. With this measure, the zero crossing point is present between the first detected magnetic detection element having an output with a different polarity and the magnetic detection element arranged upstream thereof by k magnetic detection elements, thus making it possible to immediately stop reading the output.

Furthermore, it is preferable that the approximate detection unit for the zero crossing point be configured, upon said first detection of a magnetic detection element that has an output with a different polarity, to obtain outputs of at least two magnetic detection elements to both sides of the zero crossing point by reading outputs of k−1 magnetic detection elements arranged upstream of the detected magnetic detection element. With this measure, it is possible to read outputs of the magnetic detection elements to both sides of the zero crossing point at a high speed.

It is particularly preferable that the position detection unit be configured to obtain the position of the zero crossing point by $$P=-\alpha 1/(\alpha 1+\alpha 2)\times a+P1$$

or $$P=\alpha 2/(\alpha 1+\alpha 2)\times a+P2,$$

where $\alpha 1$ is an absolute value of an output of one magnetic detection element that is arranged upstream in a reading direction out of the magnetic detection elements to both sides of the zero crossing point, P1 is a position of the upstream magnetic detection element in the array, $\alpha 2$ is an absolute value of an output of another magnetic detection element that is arranged downstream in the reading direction out of the magnetic detection elements to both sides of the zero crossing point, and P2 is a position of the downstream magnetic detection element in the array, and coordinates increase to the upstream side in the reading direction and decrease to the downstream side in the reading direction.

With this measure, it is sufficient to perform only one division that requires the most time in the calculation, resulting in time saving. Furthermore, it is possible to reduce the influence of the strength of the magnetic flux density received from the magnetic poles, temperature coefficients of the magnetic detection elements, and the like.

BRIEF DESCRIPTION OF THE DRAWINGS

FIG. 4 is a flowchart illustrating a position detection algorithm of the embodiment.

DETAILED DESCRIPTION OF THE PREFERRED EMBODIMENT

Figure 1:
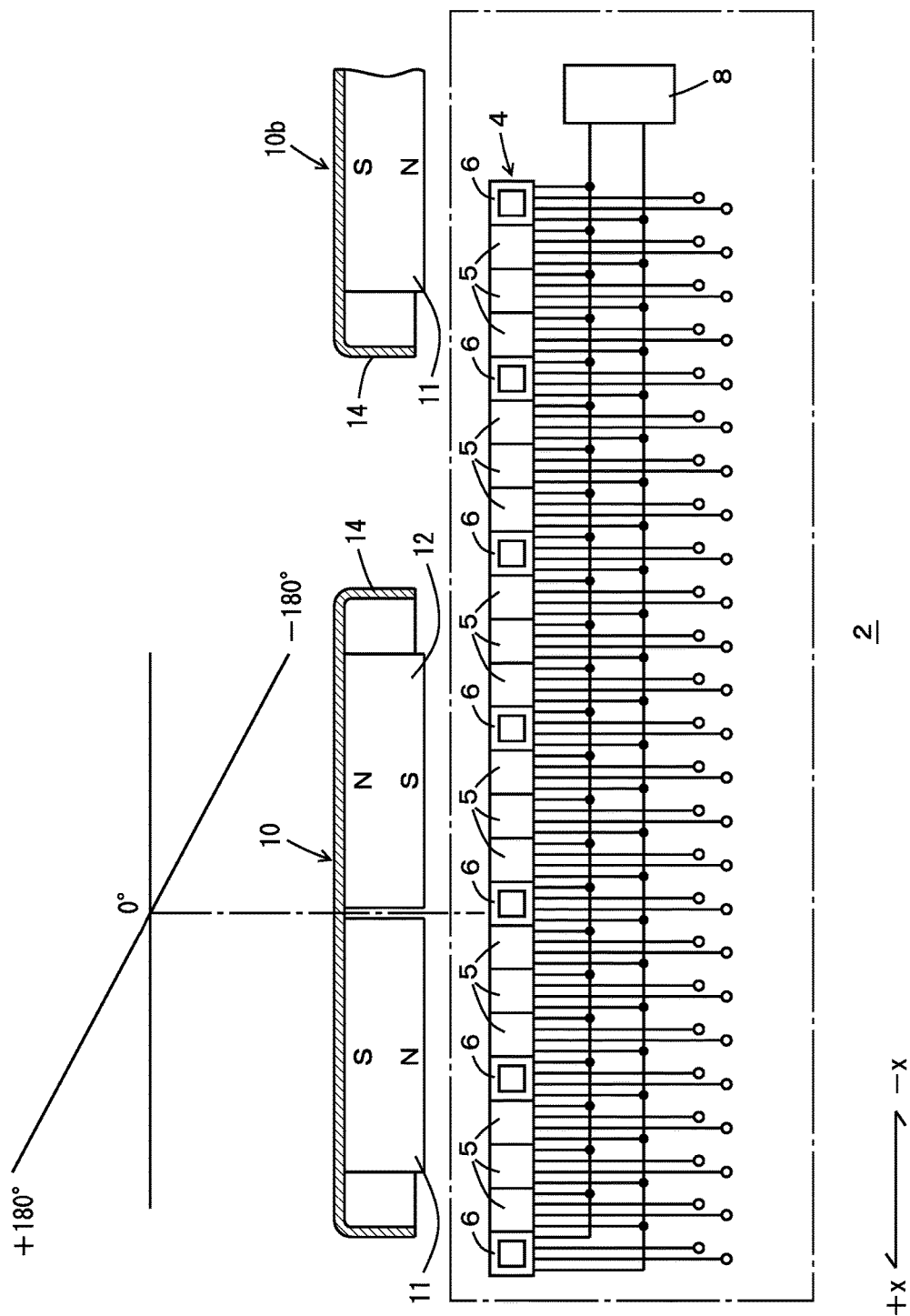
FIG. 1 is a diagram schematically illustrating an arrangement of a hall element array according to an embodiment.

The following describes a preferred embodiment of the present invention. The scope of the present invention is based on the claims, and is intended to be determined in accordance with the understanding of a person skilled in the art with reference to the description of the present invention and related art in the field of the present invention.

Embodiment

FIGS. 1 to 8 show a magnetic position sensor 2 according to the embodiment and its properties. In the drawings, the reference numeral 4 denotes a hall element array, and the reference numerals 5 and 6 denote individual hall elements. In the present invention, an output of every k-th hall element is scanned, and an approximate position of the zero crossing point is detected. "k" is a value of, for example, 2, 4, 6, 8, 12, or the like, and the embodiment will be described assuming that k=4. Regarding the hall elements arranged at every k-th position, their outputs are read at the time of scanning are denoted by "6", and other hall elements are denoted by "5". The total length of the hall element array 4 is e.g., about 50 mm to 500 mm, and for example, several dozen to several hundred of hall elements 5 and 6 in total are arranged in a single straight line. A current is applied to the hall elements from a DC power source 8, and hall electromotive forces are outputted.

The reference numeral 10 denotes a pair of magnets, and a pair of magnetic poles 11 and 12 are arranged at a distance so that their surfaces face parallel to the hall element array. Of the magnetic poles, the N pole 11 is arranged on the left side (+X side) of FIG. 1 and the S pole 12 is arranged on the right side (−X side), and the peripheries of the magnetic poles are covered with a yoke 14 such as a steel plate. The yoke 14 is used in attaching the pair of magnets 10 and shielding them against an external magnetic field. The magnetic poles 11 and 12 have opposite polarities and the same magnetic force, and in the plane that extends between the magnetic poles 11 and 12 in the direction perpendicular to the longitudinal direction of the hall element array 4, the density of the magnetic flux perpendicular to the X axis is zero. The intersection point between this plane and the hall element array 4 is the zero crossing point. In this specification, it is assumed that the X axis extends in the direction parallel to the hall element array 4, and that the left side of FIG. 1 is the +X side and the right side is the −X side. In order to indicate positions in the vicinity of the zero crossing point, a phase in which an end of the magnetic pole 11 on the +X side is +180° and an end of the magnetic pole 12 on the −X side is −180° is used as a magnetic field phase. Furthermore, serial numbers of the hall elements 5 and 6 in the hall element array 4 are used as addresses of the hall elements in order to indicate their positions in the hall element array 4. The serial number of the address is smallest at the head on the +X side, and is largest at the end on the −X side.

In the embodiment, it is assumed that a magnetic position sensor 2 such as the hall element array 4 is mounted on a mobile object, and a magnetic mark serving as a detection target, such as the pair of magnets 10, is fixed to the ground. Instead of the pair of magnetic poles 11 and 12, a large number of magnetic poles may be arrayed so that the polarity is inverted alternately. Furthermore, in order to be able to detect positions continuously, the pairs of magnets 10 may be arranged repeatedly at a distance shorter than a detection range of the hall element array 4. In this case, the distances between the pairs of magnets 10 do not need to be equal to each other. Furthermore, if a specific range is important, that is, if detection is performed in, for example, a range in which a tool or the like is precisely fed by a machine tool, or a range in which some kind of positioning is performed, or the like, pairs of magnets 10 may be arranged only in this range. Furthermore, in contrast to the embodiment, it is also possible that the magnetic position sensor 2 is fixed to the ground and the magnetic mark is mounted on a mobile object. Furthermore, it is also possible that instead of the pair of magnets 10, a line of magnets for a linear motor or the like are detected as a magnetic mark. In this specification, it is assumed that the magnetic position sensor 2 comprises the hall element array 4 and a driving circuit for driving the hall element array 4, and the pair of magnets 10 and the like are arranged outside the position sensor 2.

The embodiment is described assuming that the magnetic poles 11 and 12 are fixed to the ground, and the N pole 11 is arranged on the left side of FIG. 1 and the S pole 12 is arranged on the right side. However, in the case where the S pole 12 is arranged on the left side and the N pole 11 is arranged on the right side, it is sufficient to construe that outputs of the hall elements have the polarities (n, s) inverted with respect to the description of the specification. Furthermore, it is assumed that the absolute position of the zero crossing point is known to the position sensor. When the position of the hall element array 4 to which the zero crossing point faces becomes clear, the relative position of the position sensor 2 to the zero crossing point, which serves as a reference, will become clear, and the absolute position of the position sensor 2 will also become clear since the absolute position of the zero crossing point is known. Note that there is a case where only the relative position to the zero crossing point, serving as a reference, is required and no absolute position is required. Furthermore, when the magnetic poles 11 and 12 are arranged at known positions on the mobile object, the position of the mobile object can be acquired by acquiring the position of the zero crossing point with the magnetic position sensor 2.

Figure 2:
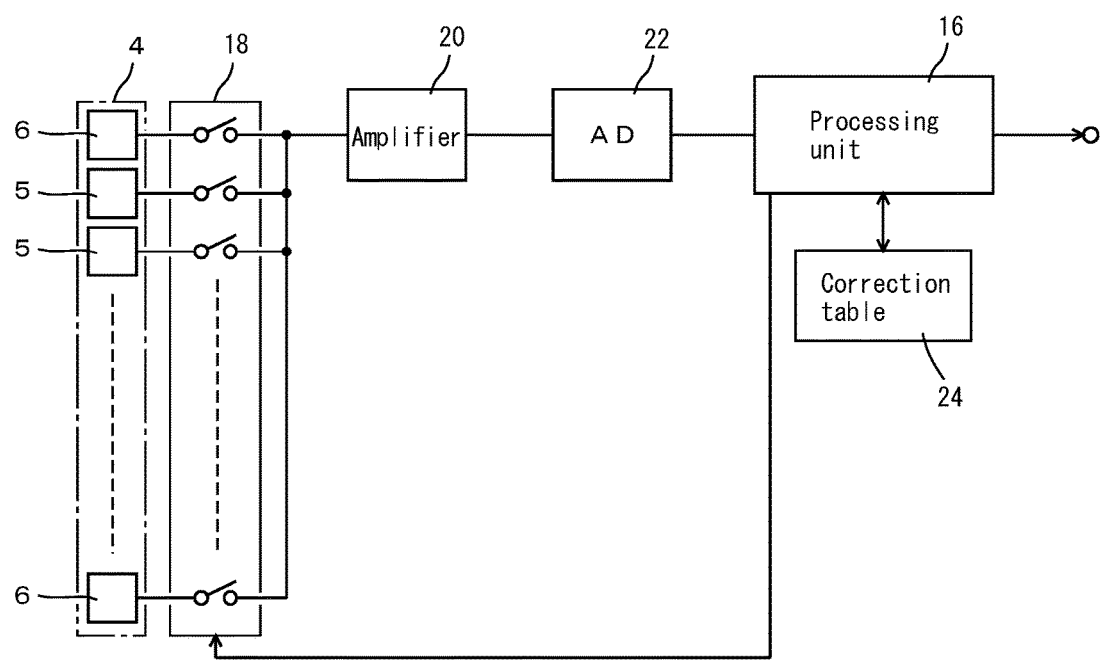
FIG. 2 is a block diagram illustrating a signal processing circuit of the embodiment.

FIG. 2 shows a circuit for driving the magnetic position sensor 2. A multiplexer 18 selects and connects the hall elements 5 and 6 to an amplifier 20, and the amplifier 20 amplifies a hall electromotive force and removes a high-frequency component of an electromotive force with an integration filter or the like. An AD converter 22 is a high-speed AD converter operating at 1 MHz or more, for example, and a processing unit 16 stores therein outputs of the AD converter 22 with a resolution of about 8-16 bits. Furthermore, the processing unit 16 subtracts a correction value unique to each of the hall elements 5 and 6 from the corresponding output of the AD converter, and detects the zero crossing point based on the outputs after the subtraction. The correction values refer to outputs of the hall elements in the state in which no magnetic field is applied from the pair of magnets 10, and are stored in a correction table 24 constituted by a nonvolatile memory.

Figure 3:
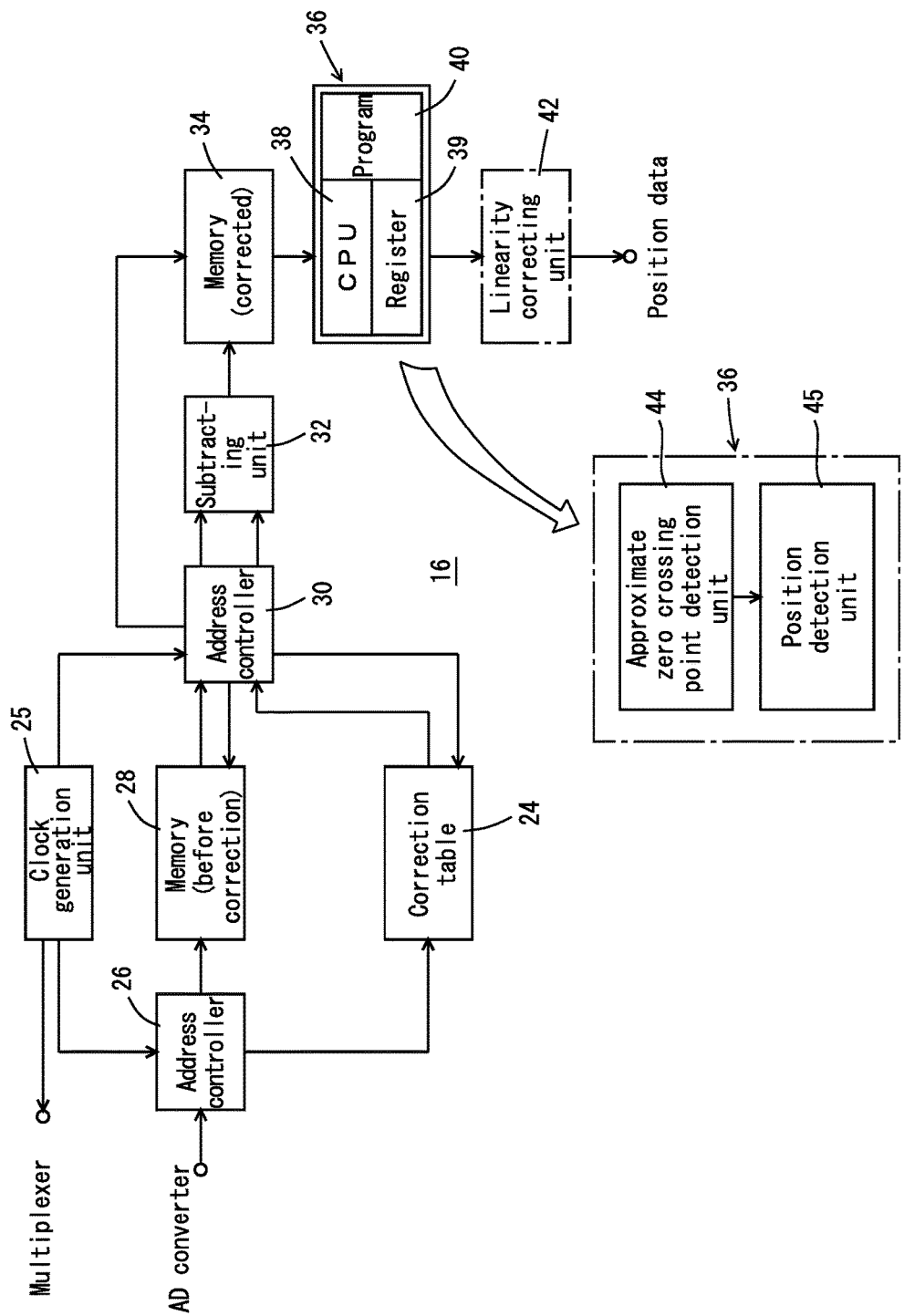
FIG. 3 is a block diagram illustrating a configuration of the processing unit of FIG. 2.

FIG. 3 shows the processing unit 16 in detail. A clock generation unit 25 generates timing signals for the timings from reading of hall electromotive forces to storing the read hall electromotive forces in the memory 34, the multiplexer 18 performs switching in accordance with the signals, and address controllers 26 and 30 generate addresses at which the data are read and written. The address controller 26 generates addresses at which signals of the AD converter 22 are written into a memory 28, and the address controller 30 generates addresses at which readings from the correction table 24 are performed and addresses at which writings into the memory 34 are performed. A subtracting unit 32 subtracts, from the outputs of the AD converter 22, the data (electromotive force correction) in the correction table 24 of the same hall elements. By the above-described processing, the electromotive forces with offset correction for the hall elements 5 and 6 are written into the memory 34. Thus hall electromotive forces in the environment where no external magnetic field is applied are corrected. And the electromotive forces of the hall elements 5 and 6 are updated in a cycle of, for example, 100 KHz or more.

A core section 36 includes a CPU 38 and a register 39, or another cache memory, and a program memory 40, and a content of a program is shown in FIG. 4. Instead of the program-driven CPU 38, another calculation element such as a digital signal processor or a gate array may be used. The core section 36 is shown as a functional block in the lower part of FIG. 3, in which an approximate detection unit for the zero crossing point 44 obtains addresses of the hall elements on both sides of the zero crossing point, and a position detection unit 45 detects an exact position of the zero crossing point based on outputs of one to four elements on each of the left and right sides of the zero crossing point.

A linearity correcting unit 42 is preferably provided in order to eliminate errors between the addresses of the hall elements 5 and 6 and the actual positions, or the like. The linearity correcting unit 42 comprises a conversion table for converting the positions obtained by the core section 36 into positions for which the errors are corrected, or a table of offsets of positions of the hall elements 5 and 6 and an adder-subtractor for removing the offsets, or the like.

Figure 5:
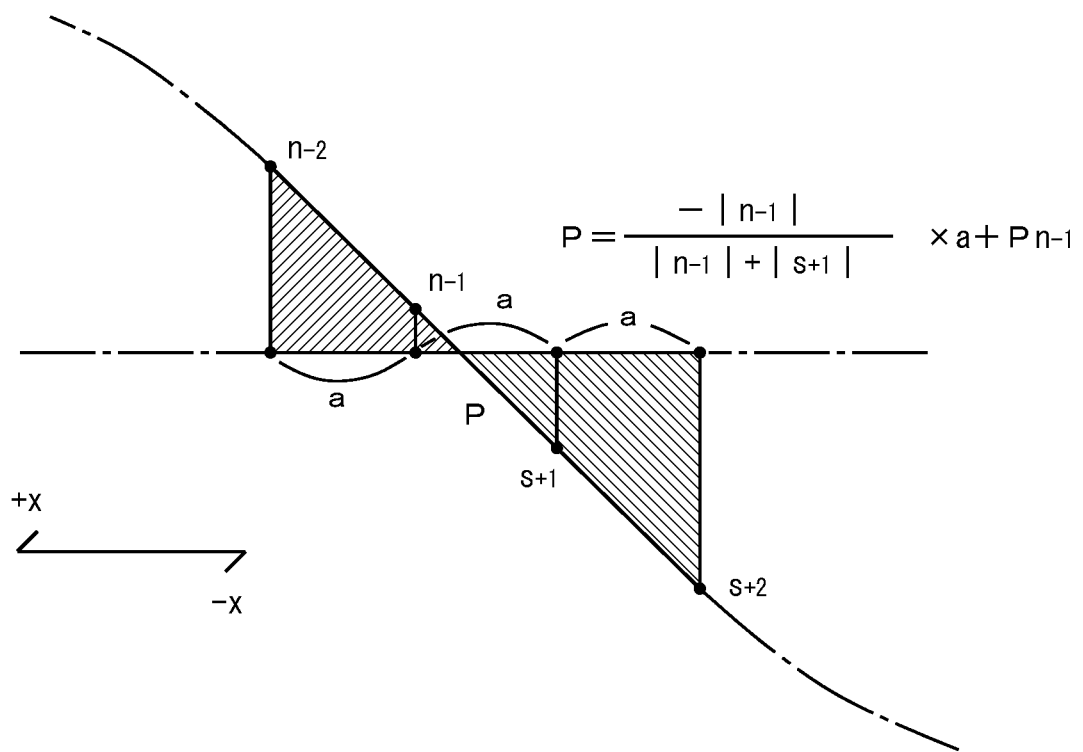
FIG. 5 is a diagram illustrating a position calculating principle of the embodiment.

FIGS. 4 and 5 show an algorithm for the position detection. The hall elements 5 and 6 may generate electromotive forces without no external magnetic field. Therefore, in the environment where no magnetic field noise is present, the outputs (outputs of the AD converter 22) from the hall elements are written into the correction table 24 constituted by a nonvolatile memory (step 1). Furthermore, external magnetic fields always present such as the terrestrial magnetic do not need to be blocked.

Components from the multiplexer 18 to the subtracting unit 32 in FIGS. 2 and 3 execute cycles comprising offset corrections on outputs of the hall elements 5 and 6, writings of the offset-corrected outputs into the memory 34. The core section 36 executes steps S3 to S5 simultaneously and synchronously with the cycle of writing the offset-corrected outputs into the memory 34. In step 3, only outputs of the hall elements 6 are scanned, in other words, an output of every k-th hall element is scanned, and the pair of hall elements in which the left element receives the magnetic flux density from the n pole (sign n) and the right element receives the magnetic flux density from the s pole (sign s) is detected. For example, the N pole 11 is present on the +X side and the S pole 12 is present on the −X side, and an output of every k-th magnetic detection element, that is, an output of every magnetic detection element 6 is read from the +X side to the −X side hall elements.

In the embodiment, because the output of the initial magnetic detection element has a polarity "n" (the N pole 11 is detected), scanning of every k-th magnetic detection element ends when a first magnetic detection element (hall element) having an output with the polarity "s" (the S pole 12 is detected) is detected. The hall element arranged upstream by k hall elements from the first detected magnetic detection element must have the output with the inverted sign and detect the N pole 11. This is realized if a span of k hall elements (k×a, where "a" is a pitch of the hall elements) is the length of one magnetic pole or shorter. It is here clear that the zero crossing point is present between the first detected hall element that has an output with "s" and the hall element arranged upstream thereof by k elements. Scanning may be performed in the direction from the −X side to the +X side, or if an approximate position of the zero crossing point can be estimated, scanning may be performed in the direction from one of the upstream and downstream of the estimated position to the other. In a general description, the polarity of the output of every k-th magnetic detection element is scanned, and the first magnetic detection element having the output with the inverted polarity to that of the initial magnetic detection element is detected.

In step 4, outputs of three elements between this pair of magnetic detection elements, and additionally, an output of one element outside this pair depending on the condition are read. It is assumed that k=4 and there are three elements between the pair, and thus outputs of three elements are read. Furthermore, the outputs of the pair of elements have already been read in step 3. Accordingly, the suitable number of elements, such as two elements whose outputs have the polarities in the order (n, s), or four elements whose outputs have the polarities in the order (n, n, s, s), are extracted. The outputs of these elements are denoted as (n−1, s+1) or (n−2, n−1, s+1, s+2). Furthermore, the above-described two elements are the two elements closest to the zero crossing point. Here, "n−1" indicates an output of the magnetic detection element on the left side of the zero crossing point, and "s+1" indicates an output of the magnetic detection element on the right side. Note that steps 3 and 4 are executed by the approximate detection unit for the zero crossing point.

In step 5, an output (n−1) of the element to the left of the zero crossing point, an output (s+1) of the element to the right of the zero crossing point, and the sum of the outputs of the two elements T=|n−1|+|s+1| are obtained. Note that |n−1| and |s+1| denote the absolute values of the outputs (absolute values of electromotive forces). Assuming that P is the position of the zero crossing point, and, for example, Pn−1 is the position of the hall element that has an output "n−1" in the array, and "a" is a pitch of hall elements, the position P of the zero crossing point is given as:

$$P=-|n-1|/(|n-1|+|s+1|)\times a+Pn-1.$$

Where "−" at the head of the formula is given because the left side of FIG. 1 is defined as the +X side. Note that the position of the hall element is determined based on its address, and P=+|s+1|/(|n−1|+|s+1|)×a+Ps+1 or the like may be used. Where Ps+1 is a position of the hall element that has an output of "s+1" in the array. When adjacent two elements arranged on both sides of the zero crossing point are used, it is possible to detect the position with accuracy and with a small amount of calculation, but the present invention is not limited to this. For example, in the foregoing example, an element that has an output of n−2, and an element that has an output of s+1 may be used. In the case where, for example, outputs of four elements are obtained, a straight line that corresponds to the outputs of the four elements may be obtained, and the point on this straight line at which the output is zero may be defined as the zero crossing point. In this case, the position P of the zero crossing point is given as:

$$P=-(|n-2|+|n-1|)/(|n-2|+|n-1|+|s+1|+|s+2|)a+Pn-1$$

The step 5 is executed by the position detection unit.

FIG. 5 shows the outputs of the hall elements in the vicinity of the zero crossing point. The zero crossing point is located at the position with respect to which a pair of magnetic poles of the pair of magnets is symmetric, and the calculation is not affected even if the distance between the hall element array and the pair of magnets changes and a distribution of the magnetic flux density changes in strength. Furthermore, the magnetic flux density changes substantially linearly within a range of about ±30° of the phases on both sides of the zero crossing point. Then, hall elements in the range in which the magnetic flux density changes linearly, specifically, two hall elements that are closest to the zero crossing point, four hall elements that are closest to the zero crossing point, or the like are extracted, and the position of the zero crossing point is obtained. Furthermore, since the ratio of the magnetic flux density is used, the calculation is affected little even if the strength of the magnetic flux density changes, or an electromotive force of a hall element changes due to an ambient temperature or the like.

Figure 6:
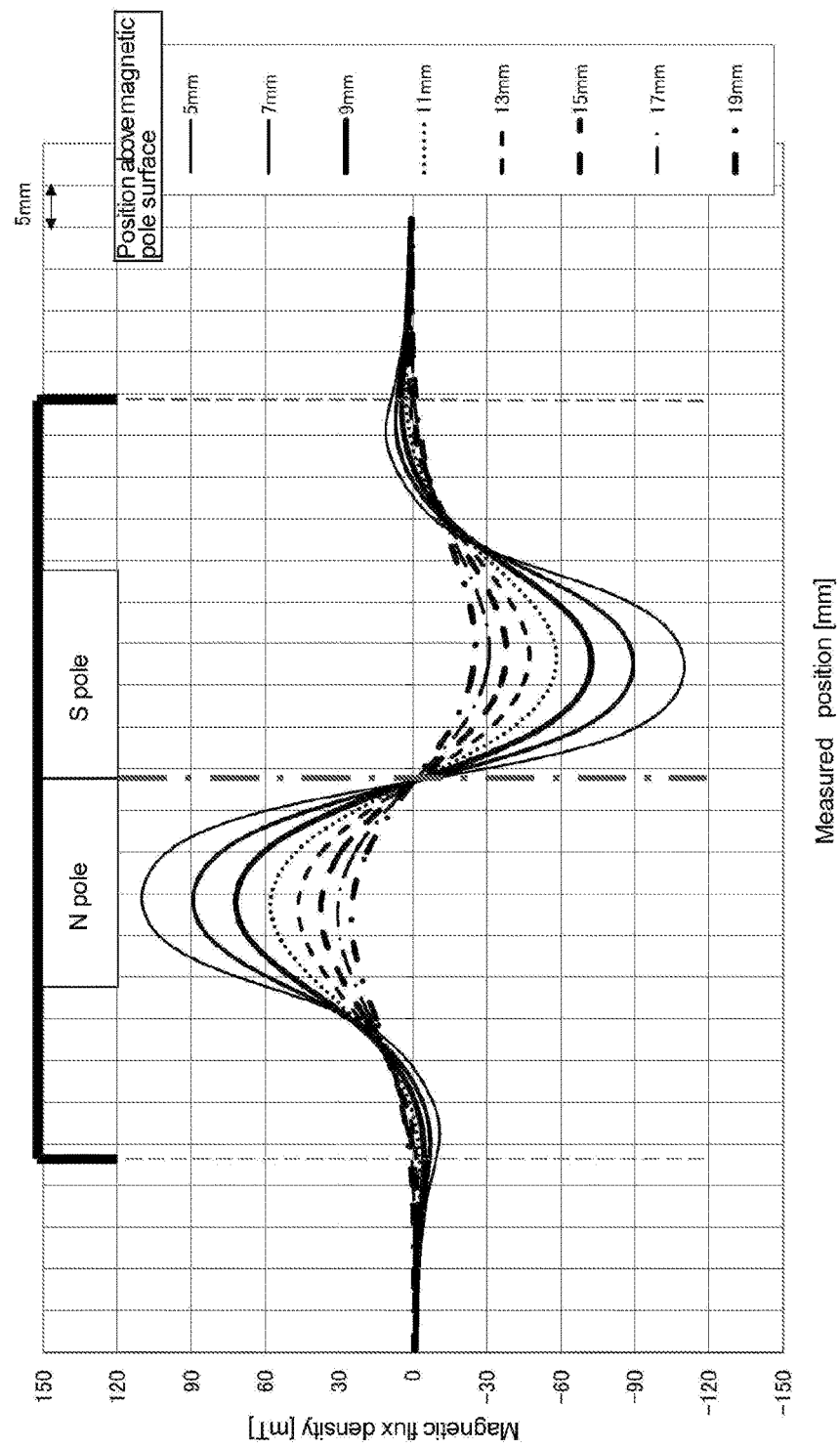
FIG. 6 is a diagram illustrating the distance from a magnetic pole surface and the magnetic flux density.
Figure 7:
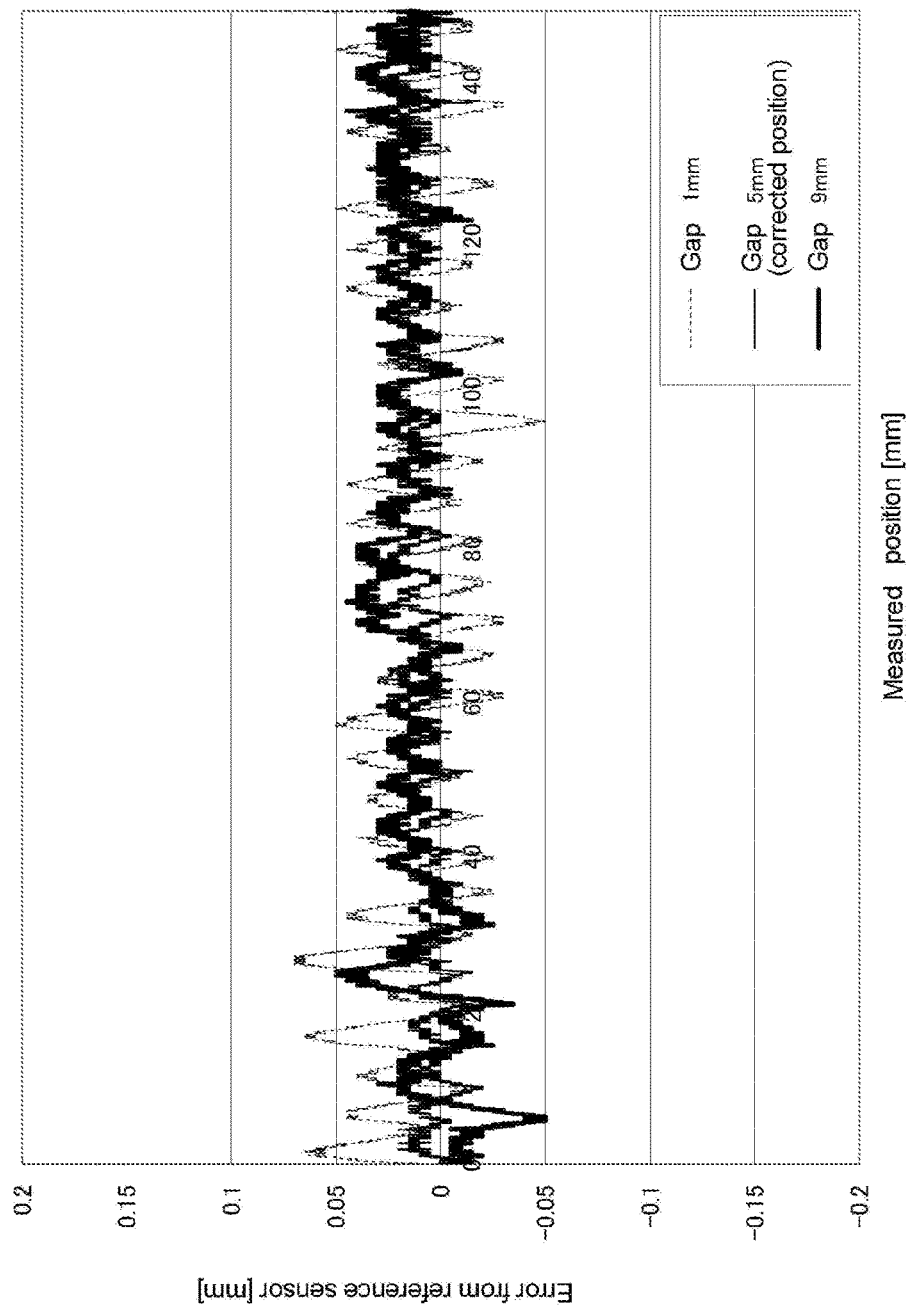
FIG. 7 is a diagram illustrating the error for a position sensor after offset error correction of the hall elements.
Figure 8:
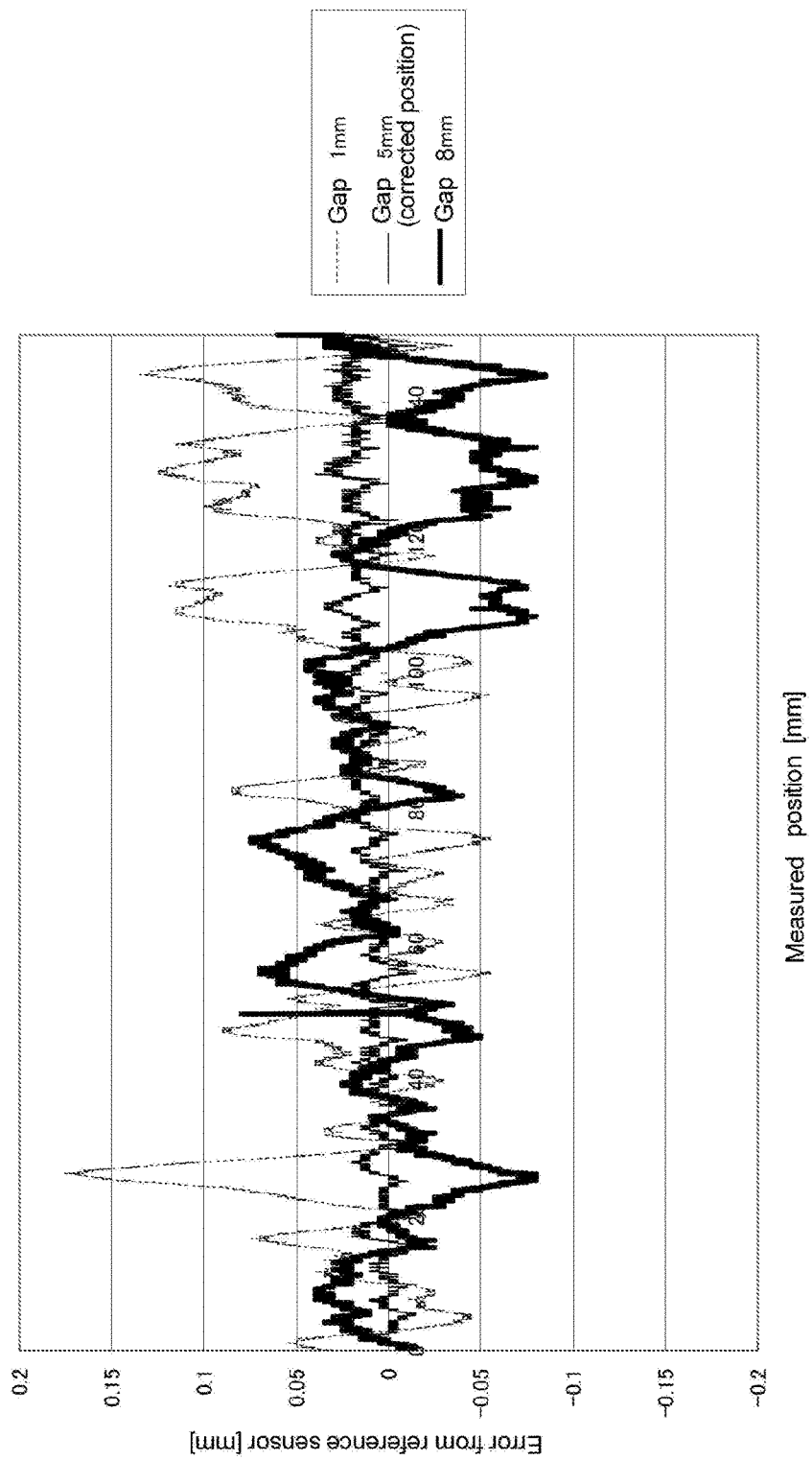
FIG. 8 is a diagram illustrating the error for the position sensor before the offset error correction of the hall elements.

FIGS. 6 to 8 show data. FIG. 6 shows a change in the magnetic flux density with respect to the distance above the magnetic pole surface, in which the distribution of the magnetic flux density is deviated from the sine wave both when the distance is too long and when the distance is too short. Here, the zero crossing point is only the point where the magnetic flux density is "n" on the left side and "s" on the right side. In the case where an output of every k-th hall element is extracted, the zero crossing point will not be missed if the length of an array of k hall elements, that is, "a×k", where "a" is a pitch of a hall element, is equal to or smaller than the length of one magnetic pole in the longitudinal direction of the hall element array. Note that also in the case where the magnets are arranged alternately and repeatedly substantially without a gap, an output of every k-th hall element is extracted. In this case, it is also possible to detect a change in the magnetic flux density not only from "n" to "s" but also from "s" to "n".

FIG. 7 shows errors when offsets of hall electromotive forces are corrected, and FIG. 8 shows errors when the offsets are not corrected. Both figures show errors from the case where a reliable sensor that serves as a reference is used. Note that, in both figures, linearity is corrected based on the data obtained at a position at which the distance between the magnetic pole and the hall element array is 5 mm. The errors are reduced by the offset correction to ½ to ⅓.

Figure 9:
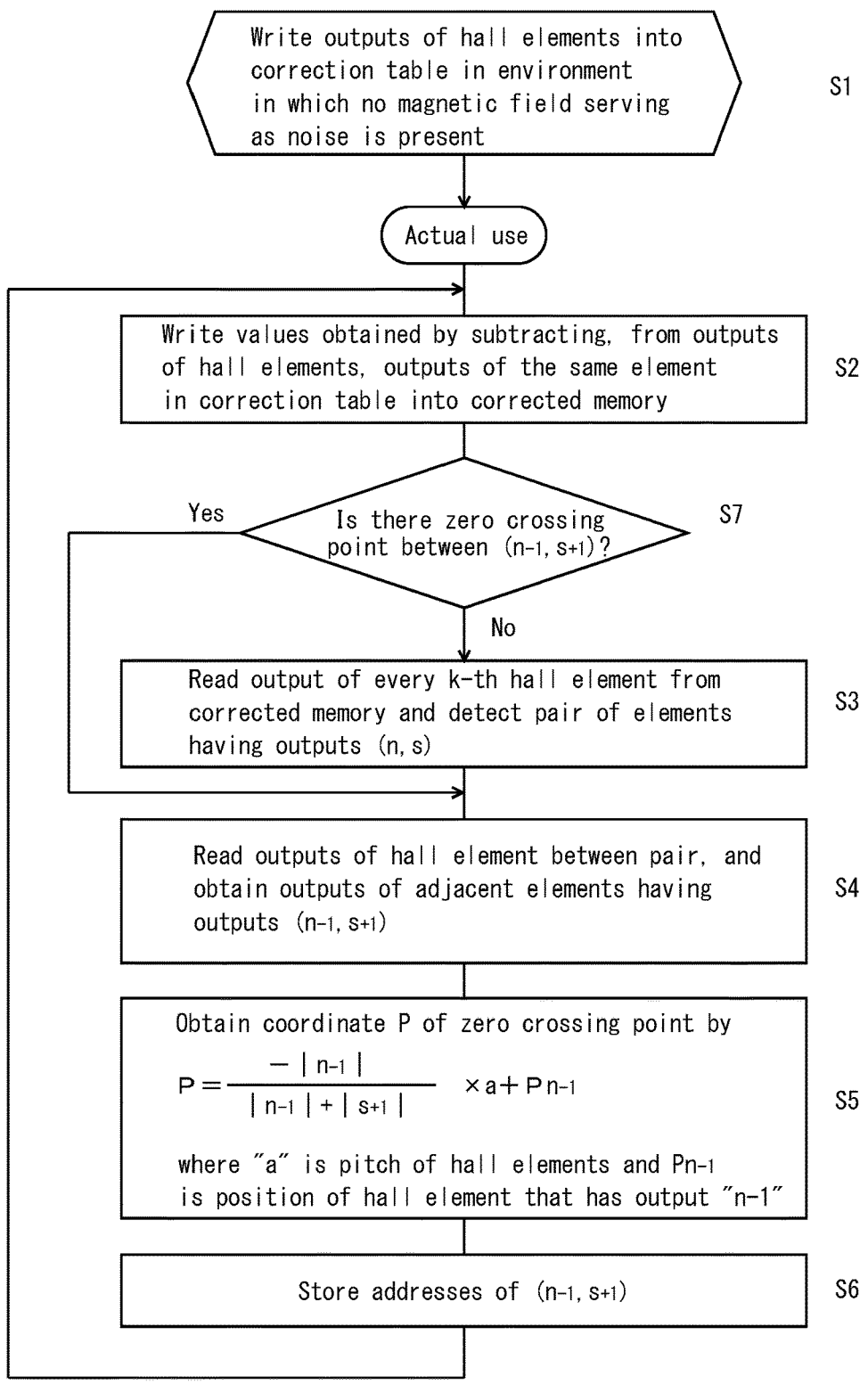
FIG. 9 is a flowchart illustrating a position detection algorithm according to a modification.

FIG. 9 shows a position detection algorithm according to a modification, and the same step number is given to the same steps as those of FIG. 4. When steps 2 to 5 of FIG. 4 are executed, at a suitable timing, the addresses of the hall elements to both sides of the zero crossing point are stored in the register (step 6). In the next position detection, it is determined whether or not the zero crossing point is present between the stored pair of addresses (step 7), and if the zero crossing point is present between the stored pair of addresses, scanning of step 3 can be omitted, and if there is no zero crossing point between the stored pair of addresses, scanning of step 3 is executed. This algorithm is used to estimate the current zero crossing point based on the last zero crossing point, and the estimation method may be changed suitably. For example, a zero crossing point may be searched for within the range of two elements to each of the right and left sides of the zero crossing point, or the like. Also, in the situation of FIG. 1, when a pair of magnets 10b on the right side enters the detection range and the original pair of magnets 10 exits the detection range, step 3 is executed after step 7.

In the embodiment, the following effects can be achieved.

1) Since an approximate position of the zero crossing point is obtained by scanning a hall electromotive force of every k-th hall element 6, it requires less time than the case where all the hall elements 5 and 6 are scanned. Specifically, the processing time can further be reduced by scanning an output of every k-th hall element and stopping the scanning when the hall element that has first detected the S pole or N pole is extracted.

2) Since an output ratio is used, it is sufficient to perform only one division that requires the most time in the core section 36, resulting in time saving.

3) Since offsets of electromotive forces of hall elements are corrected, accurate position detection is possible.

4) Since the zero crossing point is detected, position detection is not affected by whether the magnetic flux density from a line of magnets is a sine wave shape, a triangle wave shape, a trapezoidal shape, or the like.

5) Since an output ratio is used, the influence of the strength of the magnetic flux density received from the line of magnets, temperature coefficients of the hall elements 5 and 6, and the like can be reduced.

In the embodiment, the hall elements 5 and 6 are used, but any other magnetic detection elements that are not coils may be used as long as they can detect the direction and the strength of the magnetic flux density. The embodiment has described an example in which "k" is 4, but "k" may be 2, 6, 8, 12, or the like and the length of an array of k hall elements is preferably equal to or smaller than the length of one magnet (in the longitudinal direction of the hall element array). Furthermore, although outputs of one element to each of the right and left sides of the zero crossing point are used, outputs of two elements or four elements to each of the right and left sides of the zero crossing point, or the like may be used. If the detection does not require a high precision, the correction table 24 and the linearity correcting unit 42 may be omitted. If an extremely high speed is required, only outputs of the hall elements in the vicinity of an approximate position of the zero crossing point may be written into the memory 34.

LIST OF REFERENCE NUMERALS

2 . . . Magnetic position sensor, 4 . . . Hall element array, 5, 6 . . . Hall element, 8 . . . DC power source, 10 . . . Pair of magnets, 11 . . . N pole, 12 . . . S pole, 14 . . . Yoke, 16 . . . Processing unit, 18 . . . Multiplexer, 20 . . . Amplifier, 22 . . . AD converter, 24 . . . Correction table, 25 . . . Clock generation unit, 26, 30 . . . Address controller, 28 . . . Memory, 32 . . . Subtracting unit, 34 . . . Memory, 36 . . . Core section, 38 . . . CPU, 39 . . . Register, 40 . . . Program memory, 42 . . . Linearity correcting unit, 44 . . . approximate detection unit for the zero crossing point, 45 . . . Position detection unit

What is claimed is:

1. A magnetic position sensor having an array in which a plurality of magnetic detection elements are arranged in a straight line, configured to detect a zero crossing point at which a magnetic flux density from a pair of magnetic poles is zero in a plane perpendicular to a longitudinal direction of the array, the magnetic detection elements being elements whose output changes in polarity when a direction of the magnetic flux density is inverted, the magnetic position sensor comprising:

the array;

an approximate detection unit for the zero crossing point configured to read only an output of every k-th magnetic detection element of the array (where k is an integer of 2 or greater), and detect an approximate position of the zero crossing point based on first detection of a magnetic detection element that has an output with a polarity different from that of an initial magnetic detection element in the reading of every k-th magnetic detection element; and a position detection unit configured to read outputs of at least two magnetic detection elements to both sides of the zero crossing point and detect an accurate position of the zero crossing point according to the read outputs, wherein the approximate detection unit comprises a memory, and wherein the approximate detection unit is configured for repeatedly detecting the position of the zero crossing point and storing an approximate position of the zero crossing point in the memory when detecting the position of the zero crossing point, and in a subsequent detection of a position of a zero crossing point, if the zero crossing point is present in a predetermined range from the approximate position of the zero crossing point stored in the memory, the detection of an approximate position of the zero crossing point is omitted and an accurate position of the zero crossing point is detected by the position detection unit, and if the zero crossing point is not present in a predetermined range from the approximate position of the zero crossing point stored in the memory, an approximate position of the zero crossing point is detected by the approximate detection unit for the zero crossing point and an accurate position of the zero crossing point is detected by the position detection unit.

2. A magnetic position sensor having an array in which a plurality of magnetic detection elements are arranged in a straight line, configured to detect a zero crossing point at which a magnetic flux density from a pair of magnetic poles is zero in a plane perpendicular to a longitudinal direction of the array, the magnetic detection elements being elements whose output changes in polarity when a direction of the magnetic flux density is inverted, the magnetic position sensor comprising:
the array;
an approximate detection unit for the zero crossing point configured to read only an output of every k-th magnetic detection element of the array (where k is an integer of 2 or greater), and detect an approximate position of the zero crossing point based on first detection of a magnetic detection element that has an output with a polarity different from that of an initial magnetic detection element in the reading of every k-th magnetic detection element; and
a position detection unit configured to read outputs of at least two magnetic detection elements to both sides of the zero crossing point and detect an accurate position of the zero crossing point according to the read outputs,
wherein the magnetic position sensor is configured to stop scanning by the every k-th magnetic detection element and then scan the outputs of intermediate magnetic detection elements, when one of the plurality of magnetic detection elements that has a polarity that is opposite from a previous one of the plurality of magnetic detection elements is detected, and wherein the intermediate magnetic detection elements are between the one of the plurality of magnetic detection elements and the previous magnetic detection element.

3. The magnetic position sensor according to claim 2, further comprising:
a nonvolatile memory in which correction data is stored, the correction data being data acquired in an environment in which there are no magnetic poles that serve as detection targets and used in correcting an output of each magnetic detection element of the array; and
a correction unit configured to correct the output of the magnetic detection element according to the correction data stored in the nonvolatile memory.

4. The magnetic position sensor according to claim 2, wherein the approximate detection unit for the zero crossing point is configured to detect an approximate position of the zero crossing point, by reading an output of every k-th magnetic detection element in one direction along the straight line and reading an output of the magnetic detection element that detects the downstream magnetic pole of the pair of magnetic poles.

5. The magnetic position sensor according to claim 4, wherein the magnetic detection elements of the array are arranged so that k×a is equal to or smaller than the length of one magnetic pole, where "a" is a pitch of the magnetic detection element.

6. The magnetic position sensor according to claim 5, wherein
the approximate detection unit for the zero crossing point is configured, upon said first detection of a magnetic detection element that has an output with a different polarity, to obtain outputs of at least two magnetic detection elements to both sides of the zero crossing point by reading outputs of k−1 magnetic detection elements arranged upstream of the detected magnetic detection element.

7. The magnetic position sensor according to claim 6, wherein the position detection unit is configured to obtain the position of the zero crossing point by $$P=-\alpha 1/(\alpha 1+\alpha 2)\times a+P1$$

or $$P=\alpha 2/(\alpha 1+\alpha 2)\times a+P2,$$

where $\alpha 1$ is an absolute value of an output of one magnetic detection element that is arranged upstream in a reading direction out of the magnetic detection elements to both sides of the zero crossing point, P1 is a position of the upstream magnetic detection element in the array, $\alpha 2$ is an absolute value of an output of another magnetic detection element that is arranged downstream in the reading direction out of the magnetic detection elements to both sides of the zero crossing point, and P2 is a position of the downstream magnetic detection element in the array, and coordinates increase to the upstream side in the reading direction and decrease to the downstream side in the reading direction.

8. The magnetic position sensor according to claim 2, further comprising a mobile object,
wherein the magnetic position sensor is mounted on the mobile object, and wherein the pair of magnetic poles serve as a detection target.

* * * * *